(12) United States Patent
Yoon et al.

(10) Patent No.: US 10,202,526 B2
(45) Date of Patent: Feb. 12, 2019

(54) ADHESIVE COMPOSITION AND ADHESIVE FILM FOR TOUCH PANEL

(71) Applicant: LG Chem, Ltd., Seoul (KR)

(72) Inventors: Hu-Young Yoon, Gyeonggi-do (KR); Sle Lee, Incheon (KR); Chan-Oh Yoon, Chungcheongbuk-do (KR); Jang-Soon Kim, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/513,383

(22) PCT Filed: Sep. 23, 2015

(86) PCT No.: PCT/KR2015/010042
§ 371 (c)(1),
(2) Date: Mar. 22, 2017

(87) PCT Pub. No.: WO2016/052918
PCT Pub. Date: Apr. 7, 2016

(65) Prior Publication Data
US 2017/0298257 A1    Oct. 19, 2017

(30) Foreign Application Priority Data
Sep. 30, 2014    (KR) .................. 10-2014-0130880

(51) Int. Cl.
| C09J 133/06 | (2006.01) |
| C09J 11/06 | (2006.01) |
| G06F 3/041 | (2006.01) |
| C08K 5/3475 | (2006.01) |

(52) U.S. Cl.
CPC ........... *C09J 133/066* (2013.01); *C09J 11/06* (2013.01); *C09J 133/06* (2013.01); *G06F 3/041* (2013.01); *C08K 5/3475* (2013.01)

(58) Field of Classification Search
CPC .................. C09J 133/066; C09J 11/06
USPC ............................................. 428/105
See application file for complete search history.

(56) References Cited

U.S. PATENT DOCUMENTS

| 2011/0234948 A1 | 9/2011 | Yoon et al. |
| 2013/0015909 A1 | 1/2013 | Kim et al. |
| 2013/0211028 A1 | 8/2013 | Shinike et al. |
| 2013/0236673 A1 | 9/2013 | Kim et al. |
| 2013/0321991 A1 | 12/2013 | Lee et al. |
| 2014/0178608 A1* | 6/2014 | Yoon .................. G02F 1/13 428/1.55 |

FOREIGN PATENT DOCUMENTS

| JP | 2012041456 A | 3/2012 |
| KR | 100983026 B1 | 9/2010 |
| KR | 20110111826 A | 10/2011 |
| KR | 20120056174 A | 6/2012 |
| KR | 20130023183 A | 3/2013 |
| KR | 101286829 B1 | 7/2013 |
| TW | 201323570 A | 6/2013 |

OTHER PUBLICATIONS

International Search Report for Application No. PCT/KR2015/010042 dated Dec. 11, 2015.

* cited by examiner

*Primary Examiner* — Monique R Peets
(74) *Attorney, Agent, or Firm* — Lerner, David, Littenberg, Krumholz & Mentlik, LLP

(57) ABSTRACT

Provided are: an adhesive composition for a touch panel, including an acrylic resin, a first curing agent having one to three functional groups, a second curing agent having four to six functional groups, and an ultraviolet blocking agent containing a benzotriazole group; and an adhesive film for a touch panel, including a cured product of the composition.

13 Claims, No Drawings

ADHESIVE COMPOSITION AND ADHESIVE FILM FOR TOUCH PANEL

CROSS-REFERENCE TO RELATED APPLICATIONS

This application is a national phase entry under 35 U.S.C. § 371 of International Application No. PCT/KR2015/010042, filed Sep. 23, 2015, which claims priority to Korean Application No. 10-2014-0130880, filed Sep. 30, 2014, the disclosures of which are incorporated herein by reference.

TECHNICAL FIELD

The present invention relates to an adhesive composition for a touch panel, and an adhesive film including the same.

BACKGROUND ART

Recently, electronic devices such as PDAs, mobile communication terminals, or navigation systems for vehicles share a large part of an electronic market. Recently, these electronic devices have an object to secure thin and lightweight characteristics and long-term durability. Electronic devices including a touch screen or a touch panel switch at an input operation part include a transparent conductive film having a conductive metal oxide layer on one surface of a transparent film such as a polyethylene terephthalate film, and have a structure in which the transparent conductive film is laminated on a conductive glass, a reinforcing material or a decoration film, and the like via an adhesive, and the like. Since an adhesive and the like used in these electronic devices function as a medium of each layer, it is important to secure reliability which does not generate bubbles and a white turbidity phenomenon, have excellent optical characteristics, and secure long-term durability.

DETAILED DESCRIPTION OF THE INVENTION

Technical Problem

An exemplary embodiment of the present invention provides an adhesive composition for a touch panel, which has excellent reliability against bubble generation and white turbidity phenomena, and secures excellent long-term durability due to the improvement in ultraviolet blocking function.

Another exemplary embodiment of the present invention provides an adhesive film including the adhesive composition.

Technical Solution

An exemplary embodiment of the present invention provides an adhesive composition for a touch panel, including: an acrylic resin, a first curing agent having about one to about three functional groups; a second curing agent having about four to about six functional groups; and an ultraviolet blocking agent containing a benzotriazole group.

A weight ratio of the first curing agent:the second curing agent may be about 2:1 to about 4:1. The first curing agent and the second curing agent may be a hexamethylene diisocyanate (HDI)-based curing agent.

The acrylic resin may be formed by polymerizing a monomer component including: a (meth)acrylic acid ester-based monomer; and a hydrophilic functional group-containing monomer.

The monomer component may include the hydrophilic functional group-containing monomer in an amount of about 5 to about 15 parts by weight based on 100 parts by weight of the (meth)acrylic acid ester-based monomer.

The hydrophilic functional group-containing monomer may include at least one selected from the group consisting of a hydroxyl group-containing monomer, an amino group-containing monomer, a carboxyl group-containing monomer, a sulfone group-containing monomer, a morpholine group-containing monomer, a glycidyl group-containing monomer, and a combination thereof.

The (meth)acrylic acid ester-based monomer may be a linear or branched alkyl (meth)acrylate having about to about 14 carbon atoms.

A total content of the first curing agent and the second curing agent may be about 0.4 to about 1.5 parts by weight based on 100 parts by weight of the acrylic resin.

A content of the ultraviolet blocking agent containing a benzotriazole group may be about 0.5 to about 5 parts by weight based on 100 parts by weight of the acrylic resin.

Another exemplary embodiment of the present invention provides an adhesive film for a touch panel, including a cured product of the adhesive composition for a touch panel.

The cured product may be manufactured by thermally curing the adhesive composition for a touch panel at about 70° C. to about 120° C. for about 0.5 minute to about 5 minutes, and then aging the adhesive composition at about 30° C. to about 60° C. for about 1 day to about 3 days.

The cured product may have a density of about 1 $g/cm^3$ to about 1.5 $g/cm^3$.

The adhesive film may have a light transmittance of less than about 10% at a wavelength of about 380 nm or less.

The adhesive film may have a bubble generation rate of about 5 ea./$cm^2$ or less after the adhesive film is left to stand under conditions of a temperature of about 85° C. and a relative humidity of about 85% for about 200 to about 500 hours.

Advantageous Effects

The adhesive composition for a touch panel improves a ultraviolet blocking function, and simultaneously prevents bubble generation and white turbidity phenomena, and as a result, may secure excellent long-term durability and reliability.

The adhesive film for a touch panel may save costs and time during the manufacturing process, has an ultraviolet blocking function and a function of preventing bubble generation and white turbidity phenomena, which are excellent, and as a result, may impart excellent long-term durability and optical characteristics to the touch panel.

Best Mode

Hereinafter, exemplary embodiments of the present invention will be described in detail. However, the exemplary embodiments are suggested as an example, the present invention is not limited thereby, and the present invention is defined only by the scope of the claims to be described below.

An exemplary embodiment of the present invention provides an adhesive composition for a touch panel, including: an acrylic resin, a first curing agent having one to three functional groups; a second curing agent having four to six functional groups; and an ultraviolet blocking agent containing a benzotriazole group.

When an adhesive layer formed by an adhesive composition is attached to a conductive plastic base material, bubbles may be generated under high temperature and high humidity conditions due to gases (outgassing) generated from the plastic base material. Further, there may occur a problem in that warpage of the plastic base material occurs due to the generated bubbles, and as a result, the site to which the adhesive layer is attached is lifted, and when the thickness of the adhesive layer becomes small, the adhesive strength is also generally decreased. In addition, when a device including the adhesive layer is exposed to an ultraviolet ray passing through a base material on which the adhesive is applied or a film surface of the adhesive, constituent components may be decomposed or lost by the high energy of the ultraviolet ray, thereby making the durability deteriorate.

Even though the adhesive composition for a touch panel according to an exemplary embodiment of the present invention is attached to glass or a plastic base material, and then is left to stand under a high temperature and high humidity atmosphere for a long period of time, bubbles do not occur or a white turbidity phenomenon does not occur, and the light transmittance of a wavelength corresponding to that of the ultraviolet ray is so small that a device to which the adhesive composition applied may secure excellent durability and reliability.

Specifically, the adhesive composition includes: an acrylic resin; a first curing agent having one to three functional groups; a second curing agent having four to six functional groups; and an ultraviolet blocking agent containing a benzotriazole group, and may improve reliability and durability by simultaneously using the acrylic resin, the two curing agents, and the ultraviolet blocking agent containing a benzotriazole group.

The functional group of the first curing agent and the second curing agent means an isocyanate group, a curing agent having a smaller number of functional groups may be defined as a first curing agent, and a curing agent having a larger number of functional groups may be defined as a second curing agent. The functional group of the curing agent may be reacted with OH groups of the acrylic resin to form urethane. The first curing agent having a smaller number of functional groups has a relatively faster reaction rate under the same curing conditions than the second curing agent having a larger number of functional groups, and as a result, the case of simultaneously using the first curing agent and the second curing agent may improve curing density and may provide a favorable advantage in terms of process, as compared to the case of using the first curing agent or the second curing agent alone.

Specifically, when the number of functional groups of the second curing agent is less than four, there may be a concern in that the adhesive property deteriorates due to excessive crosslinking, and when the number of functional groups of the second curing agent exceeds six, there is a problem in that the aging needs to be performed for a long period of time due to slow curing, so that it is advantageous to maintain the number of functional groups within the range.

The adhesive composition may include the first curing agent and the second curing agent in an amount of about 0.3 to about 1 part by weight and about 0.1 to about 0.5 part by weight, respectively, based on 100 parts by weight of the acrylic resin.

The first curing agent and the second curing agent may be together used to allow the adhesive composition to have an appropriate crosslinking density, and the effects of adjusting the curing degree and improving the adhesive strength may be easily implemented by controlling the contents of the first curing agent and the second curing agent to the range.

Specifically, the first curing agent and the second curing agent may have a weight ratio of the first curing agent:the second curing agent of about 2:1 to about 4:1. The adhesive composition may easily implement an effect of the high temperature and high humidity reliability on a plastic substrate by including the first curing agent and the second curing agent at a weight ratio within the range.

The first curing agent and the second curing agent may be a hexamethylene diisocyanate (HDI)-based curing agent. Typically, a toluene diisocyanate (TDI)-based curing agent is frequently used, but even though the TDI-based curing agent has excellent reactivity with polyols, the TDI-based curing agent has a yellowing property and is toxic to the human body when the curing agent remains as a monomer.

Thus, it is possible to exhibit characteristics in which by using the hexamethylene diisocyanate (HDI)-based curing agent as the first curing agent and the second curing agent, a concern of yellowing is reduced, and the color difference (ΔE) is low due to the characteristics of an optical transparent adhesive film. The HDI-based curing agent may include an HDI curing agent and a derivative thereof.

The acrylic resin may be formed by polymerizing a (meth)acrylic acid ester-based monomer; and a hydrophilic functional group-containing monomer. The acrylic resin has a hydrophilic functional group and thus is bonded to functional groups of the first curing agent and the second curing agent to form urethane, and even though the acrylic resin is left to stand under a high temperature and high humidity atmosphere for a long period of time after curing, it is possible to provide an adhesive composition in which bubbles and white turbidity do not occur, and the reliability is high.

Specifically, the monomer component may include the hydrophilic functional group-containing monomer in an amount of about 5 to about 15 parts by weight based on 100 parts by weight of the (meth)acrylic acid ester-based monomer. By using the hydrophilic functional group-containing monomer in a content within the range, the adhesive composition may secure high adhesive strength, and may exhibit high reliability for a plastic base material under a high temperature and high humidity environment.

The hydrophilic functional group-containing monomer is a monomer including a hydroxyl group, a carboxyl group, an amino group, a sulfone group, a morpholine group, or a glycidyl group, and it may be advantageous to include, for example, a functional group of a hydroxyl group in terms of considering the compatibility and adhesive strength with the first curing agent and the second curing agent, and high temperature and high humidity reliability characteristics.

The hydrophilic functional group-containing monomer may include, as a hydroxyl group-containing monomer, at least one selected from the group consisting of 2-hydroxyethyl(meth)acrylate, 4-hydroxybutyl(meth)acrylate, hydroxypentyl(meth)acrylate, 6-hydroxyhexyl(meth)acrylate, 8-hydroxyoctyl(meth)acrylate, 10-hydroxydecyl(meth)acrylate, (4-hydroxymethylcyclohexyl)methyl(meth)acrylate, caprolactone modified 2-hydroxyethyl(meth)acrylate, 2-acryloyloxyethyl-2-hydroxyethyl phthalic acid, N-methylol(meth)acrylamide, N-hydroxyethyl(meth)acrylamide, 2-hydroxypropyl(meth)acrylate, 2-hydroxybutyl(meth)acrylate, 2-hydroxy-3-phenoxypropyl(meth)acrylate, 3-chloro-2-hydroxypropyl(meth)acrylate, 2-hydroxy-3-phenoxypropyl(meth)acrylate, 2,2-dimethyl-2-hydroxyethyl(meth)acrylate, and a combination thereof. For example, the hydrophilic functional group-containing monomer may include 2-hydroxyethyl(meth)acrylate, and this case may be advantageous from the viewpoint that impurities are minimally generated and the hydrophilic functional group-containing monomer is easily manufactured.

Furthermore, the hydrophilic functional croup-containing monomer may include, as an amino group-containing monomer, at least one selected from the group consisting of dimethylaminoethyl(meth)acrylate, diethylaminoethyl (meth)acrylate, and a combination thereof.

Further, the hydrophilic functional croup-containing monomer may include, as a carboxyl group-containing monomer, at least one selected from the group consisting of acrylic acid, methacrylic acid, crotonic acid, maleic acid, maleic anhydride, itaconic acid, fumaric acid, acrylamide N-glycolic acid, cinnamic acid, an acrylic acid dimer, a methacrylic acid dimer, an acrylic acid trimer, a methacrylic acid trimer, an acrylic acid tetramer, a methacrylic acid tetramer, 2-acryloyloxyethyl succinic acid monoester, 2-methacryloyloxyethyl succinic acid monoester, 2-acryloyloxyethyl phthalic acid monoester, 2-methacryloyloxyethyl phthalic acid monoester, 2-acryloyloxyethyl hexahydrophthalic acid monoester, 2-methacryloyloxyethyl hexahydrophthalic acid monoester, and a combination thereof.

The hydrophilic functional group-containing monomer may include, as a sulfone group-containing monomer, for example, olefin sulfones such as ethylene sulfone, allyl sulfone, and meta allyl sulfone, 2-acrylamide-2-methylpropane sulfone, styrene sulfone, or salts thereof, may include, as a morpholine group-containing monomer, 4-methylmorpholine, and may include, as the glycidyl group-containing monomer, for example, glycidyl(meth)acrylate, allylglycidyl ether, and the like.

A monomer component for forming the acrylic resin may include a (meth)acrylic acid ester-based monomer together with the hydrophilic functional group-containing monomer.

The (meth)acrylic acid ester-based monomer may be specifically alkyl(meth)acrylate, and the alkyl(meth)acrylate may include a linear or branched alkyl group having 1 to 14 carbon atoms, and more specifically, may include a linear or branched alkyl group having 1 to 8 carbon atoms.

For example, the (meth)acrylic acid ester-based monomer may include one or more selected from the group consisting of methyl(meth)acrylate, ethyl(meth)acrylate, n-propyl (meth)acrylate, isopropyl(meth)acrylate, n-butyl(meth) acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth) acrylate, isononyl(meth)acrylate, lauryl(meth)acrylate, tetradecyl(meth)acrylate, and a combination thereof. The '(meth)acrylate' may mean methacrylate or acrylate.

The adhesive composition for a touch panel may contain an ultraviolet blocking agent containing a benzotriazole group together with an acrylic resin, a first curing agent, and a second curing agent. The ultraviolet blocking agent minimizes a high-energy light transmittance corresponding to the ultraviolet region, and serves to improve durability and reliability.

As the ultraviolet blocking agent in the related art, oxanilide-based, hydroxybenzophenone-based, and hydroxyphenyl-S-triazine-based ultraviolet blocking agents, and the like are usually used, but in contrast, the adhesive composition may effectively block an ultraviolet ray with a relatively high wavelength band adjacent to 400 nm by using an ultraviolet blocking agent containing a benzotriazole group, and may be advantageous in terms of being capable of securing excellent compatibility with the first curing agent and the second curing agent.

The acrylic resin may have a weight average molecular weight of about 1,000,000 to about 3,000,000. When the molecular weight of the acrylic resin exceeds about 3,000,000, there is a problem in that the specific weight of the adhesive composition is increased, and as a result, the surface appearance of the adhesive film using the adhesive composition becomes poor, and when the molecular weight is less than about 1,000,000, there is a concern in that the durability is weak. Therefore, a high adhesive strength and high reliability and an excellent surface appearance may be easily implemented under a high temperature and high humidity environment by maintaining the molecular weight of the acrylic resin within the range.

In the adhesive composition for a touch panel, the total content of the first curing agent and the second curing agent may be about 0.4 to about 1.5 parts by weight based on 100 parts by weight of the acrylic resin. The adhesive composition may simultaneously implement excellent peel strength and durability by including the first curing agent and the second curing agent in a content within the range, and when the content is out of the range, the adhesive strength may become low, and the reliability at high temperature and high humidity may deteriorate.

The adhesive composition for a touch panel may include the ultraviolet blocking agent containing a benzotriazole group in an amount of about 0.5 to about 5 parts by weight based on 100 parts by weight of the acrylic resin. By including the ultraviolet blocking agent containing a benzotriazole group in a content within the range, the adhesive composition may secure an excellent ultraviolet blocking function, and may secure excellent compatibility with the first curing agent and the second curing agent. Accordingly, excellent durability, reliability and ultraviolet blocking characteristics may be imparted to a device to which the adhesive composition is applied.

The adhesive composition for a touch panel may further include at least one additive selected from the group consisting of an adhesive enhancer, a thermal initiator, a thermosetting monomer, an antioxidant, and a combination thereof.

The adhesive enhancer is added in order to allow the monomers which the adhesive composition includes to be polymerized well with each other and to improve the adhesion level, and by adding the adhesive enhancer, the adhesive property may be improved and the white turbidity phenomenon may be effectively suppressed under an external environment of high temperature and high humidity.

Another exemplary embodiment of the present invention provides an adhesive film for a touch panel, including a cured product of the adhesive composition for a touch panel.

The adhesive film for a touch panel serves as a medium of a lamination structure included in an electronic device including a touch screen or a touch panel switch, and specifically, may be disposed between a conductive film such as an ITO film and a cover window, or disposed between two conductive films.

The adhesive film includes a cured product of the adhesive composition for a touch panel, and as a result, it is possible to impart excellent durability and reliability to a device to which the adhesive film is applied.

In curing the adhesive composition for a touch panel, a thermal curing method may be used, and specifically, the curing temperature may be about 70° C. to about 120° C., and the curing time may be about 0.5 minute to about 5 minutes.

The adhesive composition for a touch panel uses a mixture of a first curing agent having one to three functional groups and a second curing agent having four to six functional groups as described above, and in the process of manufacturing the adhesive film by using the adhesive composition for a touch panel, costs and time may be saved, and specifically, an aging period after curing may be shortened.

In general, it takes about 5 days to about 7 days to carry out aging after thermal curing, and in contrast, the adhesive film for a touch panel may be manufactured by thermally curing the adhesive composition for a touch panel at a temperature and a time within the ranges, and aging the adhesive composition at about 30° C. to about 60° C. for about 1 day to about 3 days.

The adhesive composition for a touch panel may be thermally cured at the temperature and the time within the range, and subsequently aged at the time and the temperature within the range, and as a result, the time for manufacturing the adhesive film may be shortened, and simultaneously a danger against a time-elapsed change may be prevented by securing an appropriate crosslinking density and forming a stable internal structure.

Specifically, the cured product may have a density of about 1 g/cm$^3$ to about 1.5 g/cm$^3$. The 'density' means a crosslinking density after curing, the above-described adhesive composition for a touch panel may be cured by the above-described method to secure an appropriate crosslinking density, and a high adhesive strength may be secured by maintaining a crosslinking density within the range.

The adhesive film is formed from the adhesive composition for a touch panel, and the adhesive composition may include the first curing agent, the second curing agent, and the ultraviolet blocking agent containing a benzotriazole group.

In this case, the adhesive film may have a light transmittance of less than 10%, for example, less than 5%, and for example, less than about 1% at a wavelength of 380 nm or less. Further, the adhesive film may have a light transmittance of less than about 1% at a wavelength of 360 nm or less. The adhesive film may secure an excellent ultraviolet blocking function by having a low transmittance within the range for light within the wavelength range, and may improve the durability of an apparatus to which the adhesive film is applied.

In addition, the adhesive film may have a bubble generation rate of about 5 ea./cm$^2$ or less, for example, about 3 ea./cm$^2$ or less after the adhesive film is left to stand under conditions of a temperature of 85° C. and a relative humidity of 85% for about 200 to about 500 hours. The 'bubble generation rate' refers to the number of bubbles per unit area of 1 cm$^2$ after the adhesive film is applied to a body to be adhered. Even though the adhesive film is disposed at a high temperature and high humidity environment for a long period of time, the adhesive film may improve the high-temperature reliability of an apparatus to which the adhesive film is applied by exhibiting a bubble generation rate within the range.

Specifically, the adhesive film may have a light transmittance of less than about 10%, for example, less than about 5%, and for example, less than about 1% at a wavelength of 380 nm or less, and simultaneously may have a bubble generation rate of about 5 ea./cm$^2$ or less, and about 3 ea./cm$^2$ or less after the adhesive film is left to stand under conditions of a temperature of 85° C. and a relative humidity of 85% for about 200 to about 500 hours.

The adhesive film may be formed from a composition including a first curing agent, a second curing agent, and an ultraviolet blocking agent containing a benzotriazole group, and thus may secure both an excellent ultraviolet blocking function and excellent reliability, and may improve the durability of a device or apparatus to which the adhesive film is applied.

Hereinafter, specific Examples of the present invention will be suggested. However, the Examples described below are only provided for specifically exemplifying or explaining the present invention, and the present invention is not limited thereby.

EXAMPLES AND COMPARATIVE EXAMPLES

Example 1

38 wt % of 2-ethylhexyl acrylate, 44 wt % of methyl acrylate, and 18 wt % of hydroxybutyl acrylate were polymerized to manufacture an acrylic resin having a molecular weight of 1,000,000. An adhesive composition including 1 part by weight of a hexamethylene diisocyanate (HDI)-based curing agent having three isocyanate groups (—NCO), 0.3 part by weight of a hexamethylene diisocyanate (HDI)-based curing agent having six isocyanate groups (—NCO), and 2 parts by weight of an ultraviolet blocking agent containing a benzotriazole group was manufactured based on 100 parts by weight of the acrylic resin. A coating solution was prepared by mixing toluene as a solvent with the adhesive composition, and the coating solution was applied, and then thermally cured at a temperature of 80° C. for 1.5 minutes and at a temperature of 110° C. for 1.5 minutes by using a thermal curing coating device. Subsequently, the resulting product was aged at 40° C. for 2 days to manufacture an adhesive film.

Example 2

An adhesive film was manufactured in the same manner as in Example 1, except that 0.3 part by weight of a hexamethylene diisocyanate (HDI)-based curing agent having two isocyanate groups (—NCO) and 0.1 part by weight of a hexamethylene diisocyanate (HDI)-based curing agent having five isocyanate groups (—NCO) were mixed based on 100 parts by weight of the acrylic resin.

Comparative Example 1

An adhesive film was manufactured in the same manner as in Example 1, except that the adhesive composition did not include an ultraviolet blocking agent containing a benzotriazole group.

Comparative Example 2

An adhesive film was manufactured in the same manner as in Example 1, except that the adhesive composition did not include a hexamethylene diisocyanate (HDI)-based curing agent having three isocyanate groups (—NCO), and was aged at 40° C. for 7 days.

Comparative Example 3

An adhesive film was manufactured in the same manner as in Example 1, except that the adhesive composition did not include a hexamethylene diisocyanate (HDI)-based curing agent having six isocyanate groups (—NCO), and was aged at 40° C. for 5 days.

Comparative Example 4

An adhesive film was manufactured in the same manner as in Example 1, except that the adhesive composition included a hydroxybenzophenone-based ultraviolet blocking agent instead of the ultraviolet blocking agent containing a benzotriazole group.

<Evaluation>

Experimental Example 1: Measurement of White Turbidity Phenomenon and Bubble Generation Phenomenon The adhesive films in the Examples and the Comparative Examples were cut into a size of 70 mm×130 mm (breadth× length), attached to a glass base material, and then stored under conditions of a temperature of 85° C. and a relative humidity of 85% for 250 hours, and then a bubble generation rate (ea./cm$^2$) was derived, and the results are shown in the following Table 1.

Experimental Example 2: Measurement of Ultraviolet Blocking Function

The adhesive films in the Examples and the Comparative Examples were attached to transparent glass base materials, and then the light transmittances thereof were measured under the normal temperature conditions by using a uv-vis-nir spectrophotometer, and the results are the same as those shown in the following Table 1.

Experimental Example 3: Measurement of Haze

The adhesive films in the Examples and the Comparative Examples were attached to transparent glass base materials, and then the hazes thereof were measured by using a haze measuring apparatus (BYK Card Plus), and the results are the same as those shown in the following Table 1.

TABLE 1

| | Bubble generation rate (ea./cm$^2$) | Light transmittance (%) | | Haze (%) |
|---|---|---|---|---|
| | | 380 nm or less | More than 380 nm | |
| Example 1 | 0 | 0.72 | 91.0 | 0.24 |
| Example 2 | 1 | 0.75 | 90.2 | 0.26 |
| Comparative Example 1 | 0 | 31.2 | 90.4 | 0.40 |
| Comparative Example 2 | 4 | 0.74 | 90.1 | 0.27 |
| Comparative Example 3 | 3 | 0.73 | 90.0 | 0.25 |
| Comparative Example 4 | 0 | 3.41 | 89.9 | 0.31 |

Referring to Table 1, it can be seen that since the bubble generation rate is low and the white turbidity phenomenon does not occur in the adhesive films in Examples 1 and 2, the high temperature reliability is excellent, and a function of blocking an ultraviolet ray corresponding to a wavelength of 380 nm or less is excellent. Meanwhile, it can be seen that in Examples 1 and 2, a transmittance of a visible light corresponding to a wavelength of more than 380 nm is higher and a haze is lower than the transmittance and the haze in Comparative Examples 1 to 4, respectively, and accordingly, Examples 1 and 2 exhibit excellent optical characteristics in terms of visibility, and the like.

In contrast, it can be seen that in Comparative Example 1, the ultraviolet blocking function significantly deteriorates, and in Comparative Examples 2 and 3, the ultraviolet blocking function is similar to those in the Examples, but high temperature reliability and optical characteristics are significantly lower than those in the Examples, and it can be seen that in Comparative Example 4, the ultraviolet blocking function and optical characteristics are poorer than those in Examples 1 and 2.

The invention claimed is:

1. An adhesive composition for a touch panel, comprising:
   an acrylic resin;
   a first curing agent which is hexamethylene diisocyanate (HDI) derivative having two to three isocyanate groups;
   a second curing agent which is hexamethylene diisocyanate (HDI) derivative having four to six isocyanate groups; and
   an ultraviolet blocking agent containing a benzotriazole group.

2. The adhesive composition of claim 1, wherein a weight ratio of the first curing agent: the second curing agent is 2:1 to 4:1.

3. The adhesive composition of claim 1, wherein the acrylic resin is formed by polymerizing a monomer component including: a (meth)acrylic acid ester-based monomer; and a hydrophilic functional group-containing monomer.

4. The adhesive composition of claim 3, wherein the monomer component comprises the hydrophilic functional group-containing monomer in an amount of 5 to 15 parts by weight based on 100 parts by weight of the (meth)acrylic acid ester-based monomer.

5. The adhesive composition of claim 3, wherein the hydrophilic functional group-containing monomer comprises at least one selected from the group consisting of a hydroxyl group-containing monomer, an amino group-containing monomer, a carboxyl group-containing monomer, a sulfone group-containing monomer, a morpholine group-containing monomer, a glycidyl group-containing monomer, and a combination thereof.

6. The adhesive composition of claim 3, wherein the (meth)acrylic acid ester-based monomer is a linear or branched alkyl (meth)acrylate having 1 to 14 carbon atoms.

7. The adhesive composition of claim 1, wherein a total content of the first curing agent and the second curing agent is 0.4 to 1.5 parts by weight based on 100 parts by weight of the acrylic resin.

8. The adhesive composition of claim 1, wherein a content of the ultraviolet blocking agent containing a benzotriazole group is 0.5 to 5 parts by weight based on 100 parts by weight of the acrylic resin.

9. An adhesive film for a touch panel, comprising a cured product of the adhesive composition for a touch panel according to claim 1.

10. The adhesive film of claim 9, wherein the cured product is prepared by thermally curing the adhesive composition for a touch panel at 70° C. to 120° C. for 0.5 minute to 5 minutes, and then aging the adhesive composition at 30° C. to 60° C. for 1 day to 3 days.

11. The adhesive film of claim 9, wherein the cured product has a density of 1 g/cm$^3$ to 1.5 g/cm$^3$.

12. The adhesive film of claim 9, wherein the adhesive film has a light transmittance of less than 10% at a wavelength of 380 nm or less.

13. The adhesive film of claim 9, wherein the adhesive film has a bubble generation rate of 5 ea./cm$^2$ or less after the adhesive film is left to stand under conditions of a temperature of 85° C. and a relative humidity of 85% for 200 to 500 hours.

* * * * *